J. Lemmon.

Bedstead Fastening.

No. 4,028. Reissued Jun. 14, 1870.

Witnesses.
William R. McCowan.
John Snyder

Inventor.
John Lemmon

N. PETERS, PHOTO-LITHOGRAPHER, WASHINGTON, D. C.

United States Patent Office.

JAMES L. HAVEN & CO., OF CINCINNATI, OHIO, ASSIGNEES OF JOHN LEMMAN.

*Letters Patent No.* 58,437, *dated October* 2, 1866; *reissue No.* 4,028, *dated June* 14, 1870.

IMPROVED BEDSTEAD-FASTENING.

The Schedule referred to in these Letters Patent and making part of the same.

*To all whom it may concern:*

Be it known that JOHN LEMMAN, of Cincinnati, Hamilton county, and State of Ohio, invented a new and useful Improvement in Bedstead-Fasteners, of which the following is a full and clear description, reference being had to the accompanying drawing, forming part of this specification.

The invention relates to an improved mode of fastening a device to a bedstead-post to receive the rails.

A is a bedstead-post, to which is secured the improvement.

The "female part" of the fastener B is an open box of metal.

The sides *b* flare outward and continue round the lower end, *b'*, of the box.

The post A is mortised to receive the female part B, which has slots, C, to receive the lugs of any common male fasteners that are used on rails.

The edges of the sides *b* and lower end *b'* are cut to the arc of a circle, commencing at the feather edges *b''*.

Figure 1:
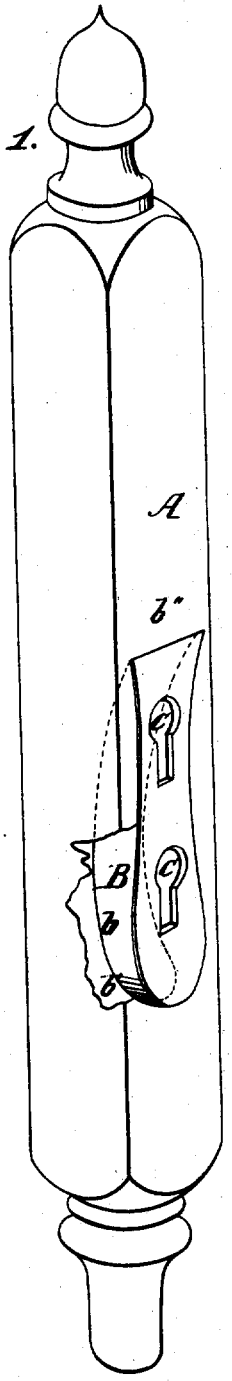
Figure 1 represents a perspective view of the improved "fastener" in its place in a bedstead-post.
Figure 4:
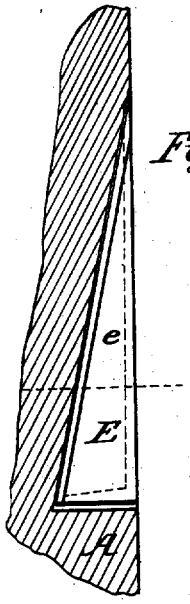
Figure 4 represents a side view, a modified form of the improved bedstead-fastener located in the post.
Figure 5:
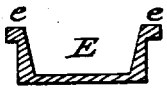
Figure 5 is a transverse section of my modified improvement, taken in the plane 1–2.
Figure 2:
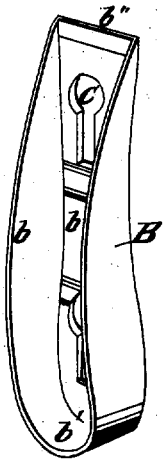
Figure 2 is a perspective view of the "female part" of the fastener, embodying the improvement, showing the shape of the piece.

In the modified form, E, of the female part, as shown in figs. 4 and 5, the sides are vertical and their edges straight from the feather edge to the opposite end; also, flanges, *e*, project externally from the edges. They fit into grooves in the sides of the mortise in posts A.

In placing the female part B of the bedstead-fastener in the mortise in post A, the lower circular end *b'* is inserted in the upper end of the mortise in post A.

The flare of side *b* secures the female portion B to posts A without the use of screws; it is readily removed without the use of instruments.

In the modified form, the edges *b* may be straight, and exterior flanges, *e*, may be made to answer in place of the flare, as shown in female part B, or the exterior flanges *e* may be applied to the part B.

Figure 3:
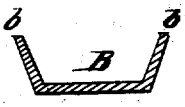
Figure 3 is a transverse section of the fastener, taken centrally, showing the plane of the side flanges.

The precise form of the sides, as shown, *b b*, fig. 3, or *e e*, fig. 5, may be varied in shape, or the cut made to emerge at the lower end, without altering the character or nature of the invention, the shapes shown being the extremes, to form the flare or dovetail.

The improvement, though primarily designed for bedsteads, is applicable to various articles of furniture and other things that require to be united by metallic fasteners.

Having described the improved fastening, its application, and utility—

We make the following claims as the invention of JOHN LEMMAN:

1. A metallic fastening, constructed as herein described and set forth, for the purpose substantially as described and specified.

2. Inserting in a bedstead-post a segment of circle, B, in a mortise with beveled sides and lower end for the purpose of securing it to the post A without any other fastening, substantially as described and set forth.

JAMES L. HAVEN & CO.

Witnesses:
J. D. PATTEN,
ALONZO HUGHES.